United States Patent
Natali et al.

(10) Patent No.: US 6,807,457 B2
(45) Date of Patent: Oct. 19, 2004

(54) SYSTEM FOR THE TELEMANAGEMENT OF WEAVING LOOMS IN WEAVING PREMISES AND METHOD OF ASSISTANCE THEREOF

(75) Inventors: Francesco Natali, Almenno San Bartolomeo (IT); Marc Arthur Uleman, Milan (IT)

(73) Assignee: PROMATECH S.p.A., Colzate (IT)

( * ) Notice: Subject to any disclaimer, the term of this patent is extended or adjusted under 35 U.S.C. 154(b) by 0 days.

(21) Appl. No.: 10/457,367

(22) Filed: Jun. 10, 2003

(65) Prior Publication Data

US 2004/0055658 A1 Mar. 25, 2004

(30) Foreign Application Priority Data

Sep. 24, 2002 (EP) ............................................. 02425574

(51) Int. Cl.$^7$ .......................... G06F 19/00; D03D 41/00
(52) U.S. Cl. ........................ 700/140; 700/143; 139/1 R
(58) Field of Search ................................ 700/140, 143, 700/130; 139/1 R, 35, 62; 340/3.32; 377/16

(56) References Cited

U.S. PATENT DOCUMENTS 3,882,305 A     5/1975 Johnstone
4,835,699 A  *  5/1989 Mallard ...................... 700/140
4,943,927 A  *  7/1990 Yarita et al. ................ 700/140
5,034,897 A  *  7/1991 Sainen ....................... 700/140

FOREIGN PATENT DOCUMENTS

EP    0 196 677    10/1986
EP    0 461 078    12/1991
GB    1 127 511     9/1968

* cited by examiner

*Primary Examiner*—Peter Nerbun
(74) *Attorney, Agent, or Firm*—Young & Thompson

(57) ABSTRACT

A method and system for the management of and assistance to weaving looms in the weaving premises includes, for each loom, a unit to control actuators, a set of operation sensors, and a logic a unit apt to correlate signals from the sensors with the control unit. The logic unit is connected, through communication elements, to a server of a service center common to various weaving premises. The server is interfaced to a client for the acquisition from and output to the weaving premises of loom data and for processing of diagnostic routines and of solutions to failures of the looms, and to database for the sorted storage of data and of diagnosis and solutions. The client is able to gain access into the database and compare data acquired from and output to the weaving premises to find solutions to the failures.

11 Claims, 4 Drawing Sheets

List of looms

| Loom | Description | Productive | Yield | Sk |
|------|-------------|------------|-------|-----|
| B110 | S.MITHOS190 | 80% | | 6E |
| B111 | S.MITHOS190 | 90% | | 6F |
| B112 | S.MITHOS190 | 95% | | 70 |
| B113 | S.MITHOS190 | 96% | | 71 |
| B114 | S.MITHOS190 | 64% | | 72 |
| B115 | S.MITHOS190 | 87% | | 73 |
| B116 | S.MITHOS190 | 32% | | 74 |
| B117 | S.MITHOS190 | | | 75 |
| B118 | S.MITHOS190 | | | 76 |
| B119 | S.MITHOS190 | | | 77 |
| B120 | S.MITHOS190 | | | 78 |
| B121 | S.MITHOS190 | | | 79 |
| B122 | S.MITHOS190 | | | 7A |
| B123 | S.MITHOS190 | | | 7B |
| B124 | S.MITHOS190 | | | 7C |
| B125 | S.MITHOS190 | | | 7D |
| B126 | S.MITHOS190 | | | 7E |
| B127 | S.MITHOS190 | | | 7F |
| B128 | S.MITHOS190 | | | 80 |
| B129 | S.MITHOS190 | | | 81 |
| B130 | S.MITHOS190 | | | 82 |
| B131 | S.MITHOS190 | | | 83 |
| B132 | S.MITHOS190 | | | 84 |
| B133 | S.MITHOS190 | | | 85 |
| B134 | S.MITHOS190 | | | 86 |
| B135 | S.MITHOS190 | | | 87 |

[Exit]     [ List of looms ]

FIG.3

SYSTEM FOR THE TELEMANAGEMENT OF WEAVING LOOMS IN WEAVING PREMISES AND METHOD OF ASSISTANCE THEREOF

BACKGROUND OF THE INVENTION

The present invention concerns a system for the telemanagement of working parameters in weaving looms and a method of teleassistance based on said system.

The technological progress in the weaving loom field has allowed to reach very high levels in the electronic management of looms and of their operation parameters, making a large number of data available, apt to be detected in real time thanks to a capillary distribution of sensors in correspondence of all the main loom members.

The acquisition of data in digital format has the advantage of allowing to suitably sort and reprocess such data with computerized systems, so as to be able to supply a set of useful information in very short times.

Such a computerized management of the loom operation data resulted in a development of sophisticated diagnostic programs (software), which are apt to locate and recognize anomalous or peculiar operating conditions, previously acquired and coded, and to show them to the operator for a specific intervention (in case of failure) or in order to establish the loom history for maintenance purposes.

According to the prior art, all this takes place on the single loom in the following way.

The loom comprises a set of actuators (which drive the weaving members) coordinated by a control unit. Also the sensors distributed on the loom send to the control unit the values of the quantities detected.

A management logic is apt, through an appropriate self-diagnostic software, to reckon the operation irregularity or pecularities, making them intelligible on an inspection display console.

The technical operator of the weaving premises, or the technician sent by the assistance and maintenance service (often a department of the actual manufacturing company), detects the failure and reads its characteristics as displayed by the self-diagnostic program on the inspection console. If he is in a position to autonomously solve the problem, he operates on the loom with a specific intervention.

In the contrary event, the technician communicates with the service center (through a telephone conversation or by sending a fax or an e-mail to apply for help), transmitting the information in his possession.

The service center is forced to reprocess the information received, so as to make it intelligible to its own diagnostic system. Since on the service center side it is not available a historical or statistical memory allowing to know in detail the "life" and operating conditions of the specific loom, the diagnostic and solution routine is rather complex and sometimes requires even several exchanges of information between the technician and the center, which takes a long time.

In some cases, when interventions have already been made in the specific weaving premises, the service center can look through the intervention reports (usually drawn up on paper by the technicians when leaving the client's site of intervention), in order to verify whether there are any elements apt to suggest the solution to be adopted; as it can be gathered, this type of work turns out to be very expensive, not very satisfactory and scarcely efficient.

At the end of the diagnosis, the service center transmits to the customer, or to his own operator on site, the sequence of operations which should be carried out in order to solve the technical problem, and the technician on the loom site provides to carry them out.

This way to proceed—with the introduction of the potentialities offered by modern weaving looms, and being confronted with the ever increasing requirements of the users—turns out to be more and more inadequate.

In particular, the requirement has arisen to offer a more efficient and prompt service of assistance, as well as possibly having an extra-value.

SUMMARY OF THE INVENTION

With these targets in mind, the Applicant has undertaken the task to supply an original system apt to take full advantage of the potentialities available, particularly inspired by the fact that the solution, specifically to the textile problems—but also to the technological (mechanical and electronic) problems in general—depends more and more on the possibility to have properly stored, interdependent and complete historical data.

Another object of the present invention is to supply a system which requires less human intervention, so as to lower the costs and reduce the intervention times.

A further object of the present invention is to supply a system which, besides supplying diagnostic capabilities and assistance to failures, is apt to utilize the same kind of information to supply an additional extra-value feature, in normal operating conditions.

According to an aspect of the present invention, it is provided a system of teleassistance which allows a weaving premises and a remote service center to share, in real time, the setup data of a loom out of work for failure—for a fast diagnosis and repair of the damage—as well as to collect, in a sorted and systematic form, an amount of textile, electronic and mechanical data, meant to build up a central reference database supplying an extra-value.

BRIEF DESCRIPTION OF THE DRAWINGS

Further characteristics and advantages of the system according to the present invention will anyhow be more evident from the following detailed description of some preferred embodiments thereof, given by way of example and illustrated on the accompanying drawings, in which:

FIG. 3 is a scheme of a possible selection performed by the service center on the system according to the invention.

DETAILED DESCRIPTION OF THE PREFERRED EMBODIMENTS

Figure 1:
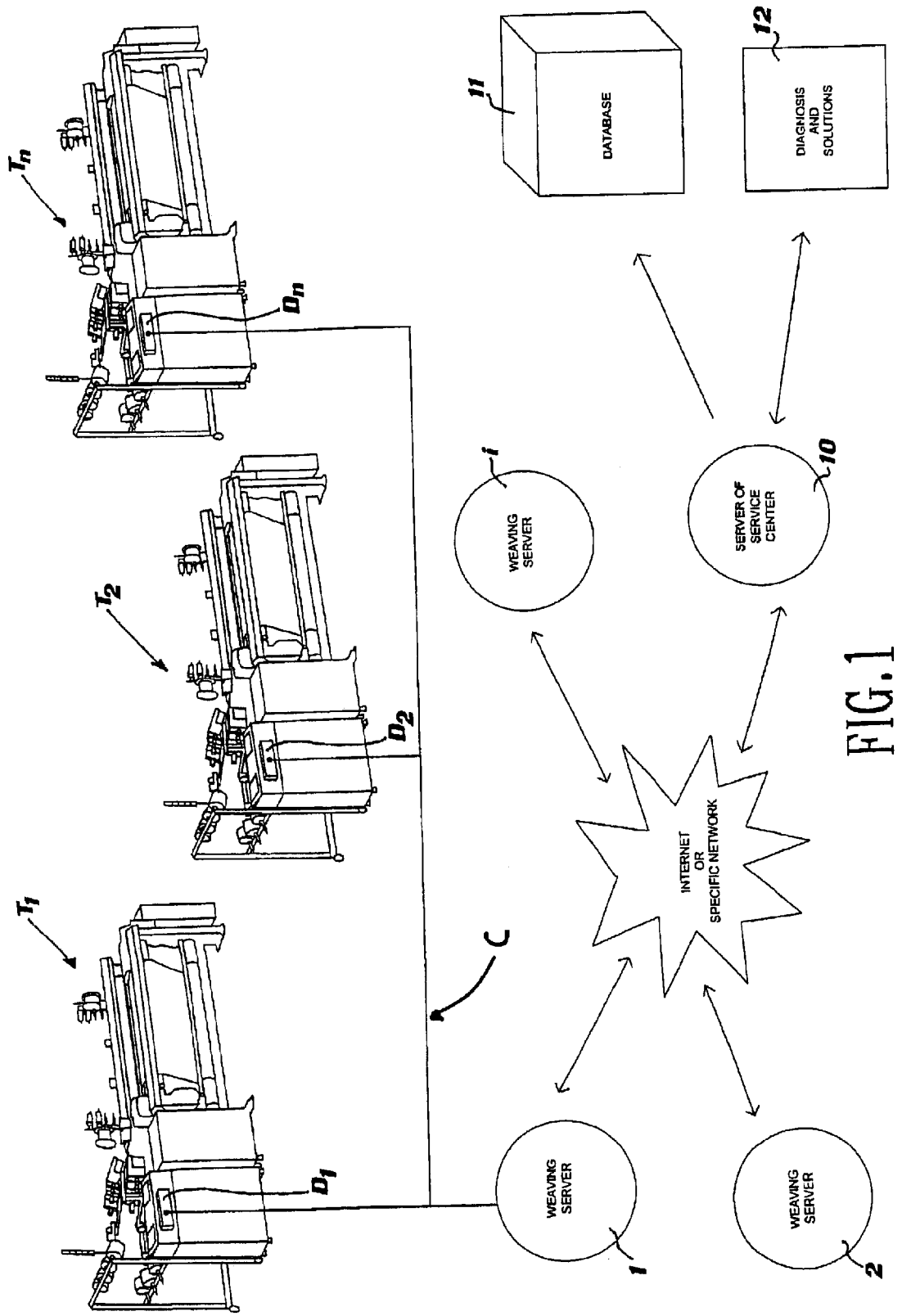
FIG. 1 is a diagram illustrating the layout of the system according to a first embodiment of the invention.

As shown in FIG. 1, a weaving premises normally comprises a certain number N of looms $T_1$, $T_2$, $T_n$, regularly located inside wide premises used for the purpose.

Each loom comprises a set of sensors, which detect the operating conditions of a large number of loom members, a unit to control the actuators, and a management logic which coordinates the control unit on the basis of preset profiles and of the data supplied by the sensors.

According to a first embodiment of the present invention, each loom is provided with a data transmission module D1, D2, . . . Dn—suitably interfaced with the management logic—apt to transmit and receive data to and from said logic, said module being connected to a server 1 of the weaving premises, apt to manage and store such data.

The connection between the various looms and the server 1 can be obtained in different ways, diagrammatically illustrated in FIG. 1 by the line C: for example by cable, by radio, or through other wireless communication technologies.

Figure 4B:
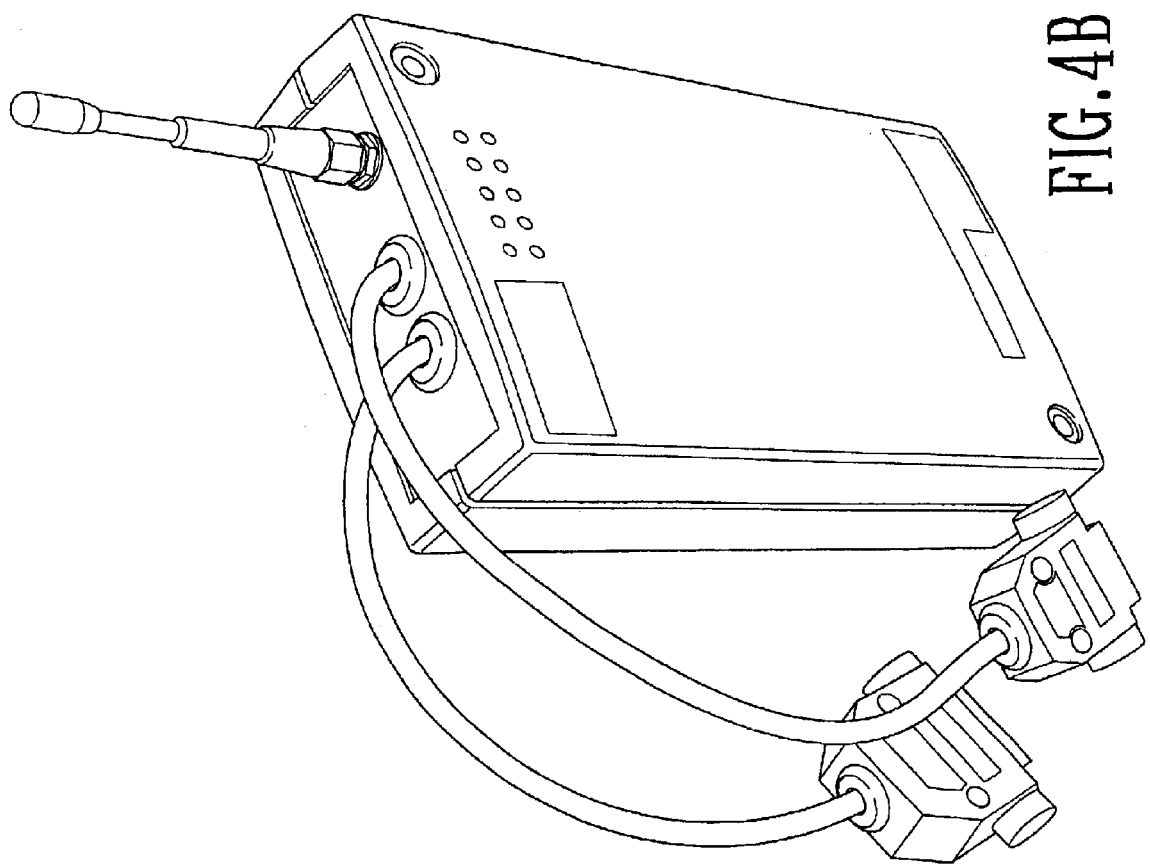
FIGS. 4A and 4B are perspective views showing, respectively, a GSM transmission unit and a DECT transmission unit.

For example, each management logic communicates—according to known technology—with a wireless transmission module provided on the loom (for example, the DECT module of FIG. 4B), which then transmits to a premises hub the data detected by radio. According to the size of the weaving premises, there can be more covering cells and more hubs which then lead to the same server 1.

The server 1 of the weaving premises is moreover connected—through a specific network or, preferably, through Internet—to a server 10 of the remote service center. The connection to the communication network can be obtained through one of the many available systems, for example by modem.

The server 1 can store the received data in a local memory, for actual use by the end user and until it may become necessary to download such data, thereby forming a historical memory of the weaving activity of the premises, for each loom; alternatively, the server holds the acquired data in a buffer for the time strictly required to process the received data in a suitable protocol (for example, TCP/IP) for transmission.

A similar arrangement is foreseen for a certain number I of weaving premises at $2_i$; served by the same server 10 of the service center.

The server 10 is interfaced with a database 11—where the data sent by the weaving premises is sorted and stored—and with a computer 12, on which the processing of diagnostic routines and of solutions to failures is carried out, comparing the data read in real time by the server 1 with the data stored in the central database 11, on the basis of specific procedures set up time after time according to requirements and to the requisites.

The data transmission sequences are preferably monitored and controlled by an operator at the service center side.

Operatively, if the communication between the server 10 and the i-th server 1 of the weaving premises is established by Internet, also a safe access system—for example of the password type—is arranged.

In other words, the technician working with the computer 12 of the service center can start a session of data acquisition or of direct intervention on the single loom (for example, to have access to and modify the setup data of said loom), always through the i-th server 1, introducing a password in a dialogue window.

In this initial dialogue phase, for example, the operator identifies in a list of available looms (FIG. 3) those whose productive yield (percentage ratio between productive time and overall time) is below a certain threshold and he triggers, after insertion of the password, the acquisition of the respective data held in the memory (for a subsequent processing), or else a direct intervention on the working parameters.

According to the invention, the diagnostic and solution software is mainly implemented on the computer 12 of the service center. With the arrangement of the invention, the diagnostic software can advantageously benefit from the historical data sorted in the database 11 of the service center. This latter holds a set of historical operating and faulting data, not only of the single loom but also of a variety of looms even of different weaving premises, as well as a set of data typical of the service center, such as data deriving from simulations, laboratory tests and advanced research.

Once having reckoned the solutions to the technical problem occurred, the sequence of operations to be carried out on the n-th loom of the i-th weaving premises is processed in digital format and sent back to the i-th server 1, in the way pointed out above. From here, the sequence is directed to the respective n-th loom. The procedure is then automatically implemented, through the management logic, in the control unit of the loom exactly as if a qualified technical operator were on site, but in far shorter times.

Advantageously, as soon as the n-th loom is started again, with the repairing sequence procedure just implemented, the loom data and working parameters are acquired and sent back, for a certain lapse of time, to the server 10 of the service center, so as to allow storing at once the proposed solution procedure with the respective actioning obtained and allow having a prompt return on the efficiency of the intervention, which information is extremely useful in view of an optimal construction of the database 11.

Figure 2:
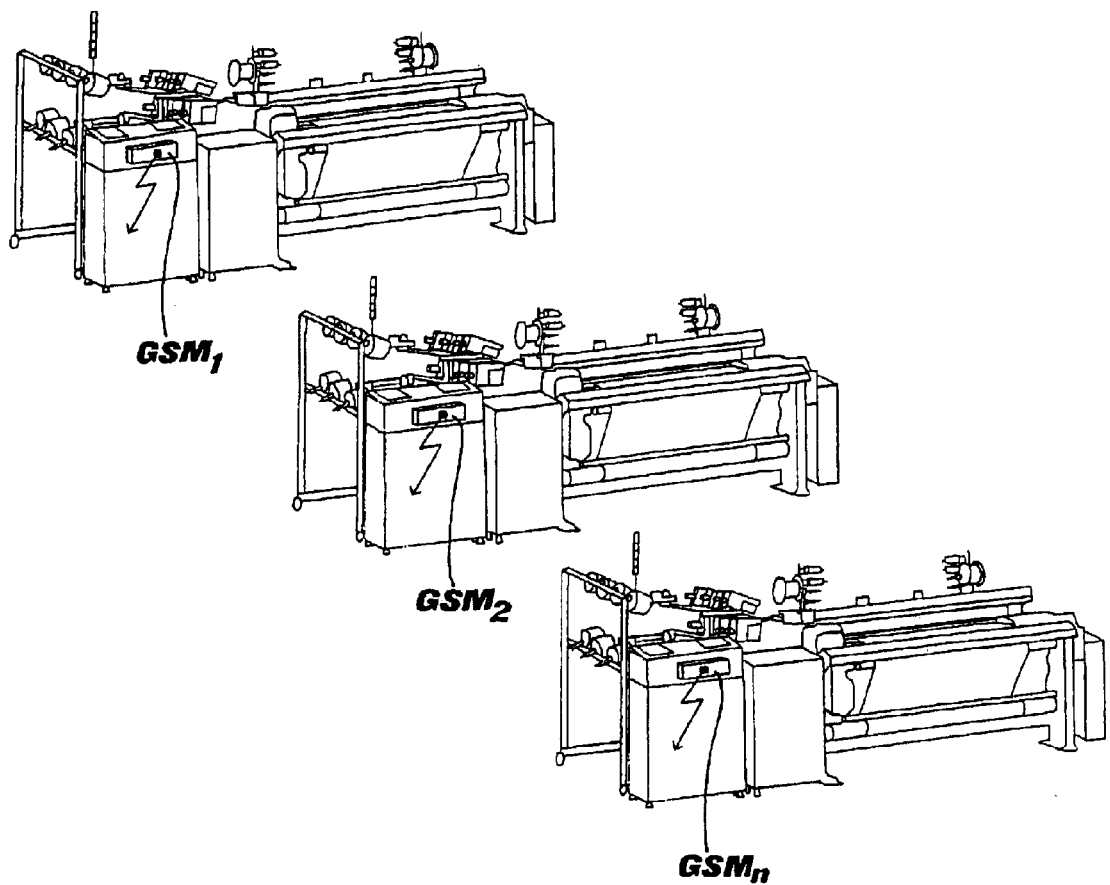
FIG. 2 is a diagram illustrating the layout of the system according to another embodiment of the invention.
Figure 2:
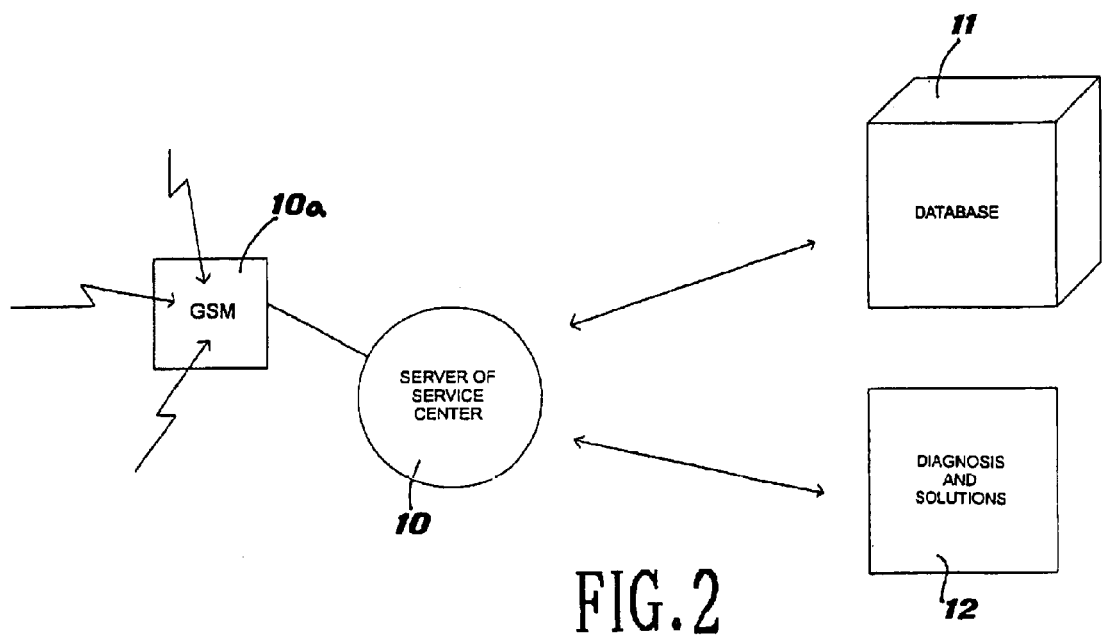
Figure 4A:
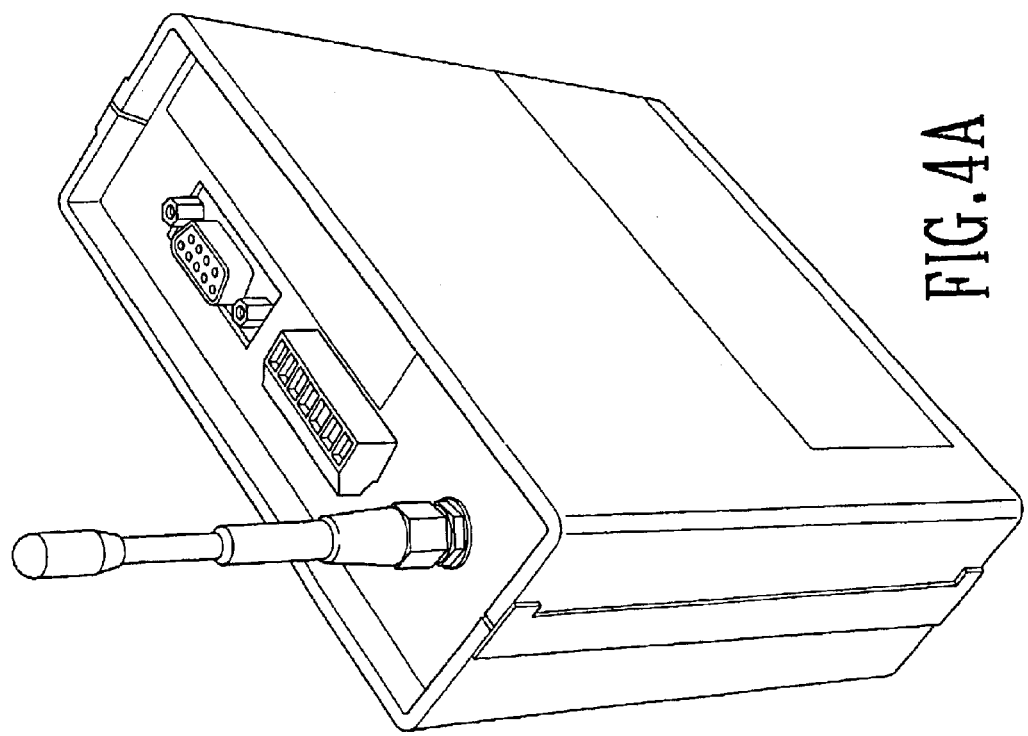

According to an alternative embodiment, illustrated in FIG. 2, each management logic is connected to a mobile phone communication module, such as module GSM1, GSM2 . . . GSMn, for example integrated in the loom or forming part of a separate unit suitably connected to the loom (FIG. 4A).

If activated, said GSM module is apt to send short messages (SMS)—containing, in digital format, the working parameters of the loom and/or the diagnostic signals locally processed by the control unit—through any provider of such a service, directly to a GSM receiving unit 10a interconnected with the server 10 of the service center.

The solution procedure is processed as described heretofore and sent back to the respective loom with the same technology of the digital messages SMS.

This second embodiment of the invention implies no interventions on the preexisting structures in the weaving premises, but it may involve further installation and management costs due to the charges tied to the GSM apparatuses and transmissions.

Alternatively, to avoid having to equip each loom with a SIM identification card (with the charges deriving therefrom), it is possible to simply provide the looms with a housing unit apt to house a SIM card, which can easily be replaced so as to be transferred from one loom to the other at need. Preferably, the interface with the replaceable SIM card is apt to be connected to the standard terminals of a common mobile phone: in this way, the operator of the weaving premises does nothing but couple his own mobile phone with the loom, in order to establish the automatic connection with the service center, without having to disassemble any device or having to handle a delicate SIM card several times.

It can be easily understood that, thanks to the interconnection and to the capacity of correlation supplied by the system of the present invention, the advantages obtained are remarkable, both as far as times and costs, and—above all—as far as efficiency of the proposed solution.

In fact, the possibility to have a prompt confirmation on the results obtained with the repairing procedure adopted, as well as the creation of a central database in which to sort and store, in time all the operating data and the defects/solutions found on/for the looms, allows to very rapidly process a series of diagnostic and solution procedures more and more accurate as the database grows in size.

Finally, the creation and growth of the database 11, obtained in concomitance with the operations of diagnosis and maintenance provided by the service center, allows a vast amount of textile, mechanical and electronic data to become available in correspondence of each typology of woven product; this also enables to supply the user with precious information for the steady production of a variety of special fabrics.

Such database allows in fact, through appropriate processing, to reinstate information which is very useful and efficient to establish the loom setup which is most appropriate for each single fabric being created.

The creation of such a database (in which the setting parameters of the loom—like yarns tension, geometric asset, and so on—are associates to a specific textile article) represents a potential instrument for weaving a number of different textile articles.

Besides, in so doing, it is possible to considerably shorten the times to set up a new weaving premises, or to change an article, thereby combining a remarkable extra-value feature to the service supplied by the service center. This extra-value feature—which may be found according to the known technique merely in the know-how of each specific user—is made easily available to a group of users, interfaced with the service center, which can draw undeniable profits therefrom.

It is anyhow understood that the invention is not limited to the particular embodiments described heretofore, which merely represent non-limiting examples of its scope, but that a number of variants can be introduced, all within reach of a person skilled in the art, without thereby departing from the scope of the present invention.

What is claimed is:

1. Managing and assistance system for weaving looms in a plurality of physically separated weaving plants, comprising, for each loom, a unit to control actuators, a set of sensors to detect operating conditions, and a logic unit apt to correlate signals of said sensors with said control unit, wherein said logic unit is connected, through communication means, to a remote server of a service center common to said plural physically separated weaving plants, said server being interfaced to a client for the acquisition from and output to the plural physically separated weaving plants of loom data and for processing of diagnostic and solution procedures addressed to failures of the looms, as well as to a database for the sorted storage of such data and of said diagnostic and solution procedures, said client being able to gain access to said database so as to make comparisons with the data acquired from and output to the plural physically separated weaving plants to thereby find solutions to failures.

2. Managing and assistance system for weaving looms in plural physically separated weaving plants, as claimed in claim 1, wherein said communication means consist, for each loom, of a transmission device interfaced with said logic unit, so as to send to said remote server of the service center current data of the loom and receive from said center modified data meant to be implemented in the control unit by said logic unit.

3. Managing and assistance system for weaving looms in the plural physically separated weaving plants, as claimed in claim 2, wherein said transmission device is a component of a wireless transmission cell affecting the respective loom, said cell being then connected, possibly through a hub, to a server of the weaving plants which is in turn connected to said remote server of the service center.

4. Managing and assistance system for weaving looms in the plural physically separated weaving plants, as claimed in claim 1, wherein said communication means also include the Internet arranged between said server of the service center and said plural physically separated weaving plants.

5. Managing and assistance system for weaving looms in the plural physically separated weaving plants, as claimed in claim 2, wherein said transmission device is a mobile phone communication module for the transmission and reception of digital messages, and wherein a similar mobile phone communication module is interfaced with the remote server of the service center, said data sent from and received by the plural physically separated weaving plants being transferred between the remote server of the service center and the looms in the form of digital messages.

6. Method of assistance for weaving looms in plural physically separated weaving plants, comprising the steps of:

acquiring a set of data relating to steady working or malfunction conditions of the loom, from operation sensors distributed on the loom;

processing such data so as to supply a malfunction diagnosis, or other useful information to be reinserted, as modified data, into a control unit of said loom;

transmitting said acquired data to a remote server of a service center common to the plural physically separated weaving plants;

storing such data in a database;

comparing, by means of a computer, the acquired data with the data stored in the database, so as to work out a procedure of corrective intervention on the loom;

rearranging such a procedure of corrective intervention in the form of modified data; and transmitting to said loom such modified data, so that they are replaced in said control unit.

7. Method as in claim 6, wherein said data transmission steps are also carried out through the Internet.

8. Method as in claim 6, wherein said data transmission steps are also carried out through a wireless transmission network.

9. Method as in claim 8, wherein said wireless transmission network consists of a mobile phone communication network, as a GSM or DECT.

10. Method as in claim 6, wherein data relating to loom steady working conditions are acquired into said database immediately after the modified data has been replaced in said control unit.

11. Method as in claim 6, comprising moreover the following steps:

acquiring in said database data relating to steady working condition together with indications of the specific textile product being woven, during the respective data acquisition step; and selecting said data relating to steady working condition according to the desired textile product, and replacing such steady data, as modified data, in the control unit of the loom of a weaving premises at start up of new plant or upon changing of an article.

* * * * *